(12) United States Patent
Ding

(10) Patent No.: US 9,546,922 B2
(45) Date of Patent: Jan. 17, 2017

(54) ABSOLUTE PRESSURE SENSOR WITH IMPROVED CAP BONDING BOUNDARY

(71) Applicant: Continental Automotive Systems, Inc., Auburn Hills, MI (US)

(72) Inventor: Xiaoyi Ding, Lake Zurich, IL (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 203 days.

(21) Appl. No.: 14/289,874

(22) Filed: May 29, 2014

(65) Prior Publication Data

US 2015/0040675 A1 Feb. 12, 2015

Related U.S. Application Data

(60) Provisional application No. 61/864,148, filed on Aug. 9, 2013.

(51) Int. Cl.
*G01L 9/00* (2006.01)
*G01L 19/04* (2006.01)
*G01L 19/06* (2006.01)

(52) U.S. Cl.
CPC ............. *G01L 9/0055* (2013.01); *G01L 19/04* (2013.01); *G01L 19/06* (2013.01)

(58) Field of Classification Search
CPC .................................. G01L 9/00; G01L 19/14
USPC ........................................................ 73/754
See application file for complete search history.

(56) References Cited

U.S. PATENT DOCUMENTS

| 6,326,682 | B1 * | 12/2001 | Kurtz | B81B 7/0077 |
| | | | | 257/415 |
| 6,848,320 | B2 | 2/2005 | Miyajima et al. | |
| 6,890,834 | B2 * | 5/2005 | Komobuchi | B81B 7/0077 |
| | | | | 257/E23.193 |
| 7,499,604 | B1 * | 3/2009 | Burns | G01L 9/002 |
| | | | | 385/12 |
| 7,622,782 | B2 * | 11/2009 | Chu | B81C 3/001 |
| | | | | 257/415 |
| 8,171,800 | B1 | 5/2012 | Chiou | |
| 8,215,176 | B2 * | 7/2012 | Ding | G01L 19/0069 |
| | | | | 361/283.4 |

(Continued)

FOREIGN PATENT DOCUMENTS

| JP | S5845533 A | 3/1983 |
| JP | H0777471 A | 3/1995 |

(Continued)

*Primary Examiner* — Lisa Caputo
*Assistant Examiner* — Octavia Hollington

(57) ABSTRACT

A pressure sensor includes a top cap with a recess formed in an end of the top cap and a cavity formed in the end of the top cap to communicate with the recess. The cavity extends further axially into the top cap than the recess thereby having depth greater than a depth of the recess. Outer edges of the recess extend laterally outward beyond outer edges of the cavity thereby defining a bonding boundary. A silicon substrate has a sensing circuit on a top side thereof. The top cap is bonded to the top side of the silicon substrate in a range from the outer edges of the top cap to the bonding boundary. The recess and the cavity of the top cap face the top side of the silicon substrate and form a reference vacuum cavity. When pressure is exerted on a backside of the substrate, a portion of the substrate is constructed and arranged to deflect.

12 Claims, 2 Drawing Sheets

(56) References Cited

U.S. PATENT DOCUMENTS 8,627,559 B2 * 1/2014 Suminto ............ B81C 1/00158
257/659
2013/0068022 A1 3/2013 Jeung et al.

FOREIGN PATENT DOCUMENTS

| JP | 2011237364 A | 11/2011 |
| JP | 2012026956 A | 2/2012 |
| JP | 2013145154 A | 7/2013 |

* cited by examiner

ABSOLUTE PRESSURE SENSOR WITH IMPROVED CAP BONDING BOUNDARY

This application is based on U.S. Provisional Application No. 61/864,148, filed on Aug. 9, 2013 and claims the benefit thereof for priority purposes.

FIELD

The invention relates generally to a backside absolute pressure sensor having a cap with an improved bonding boundary so as to effectively balance the thermal stresses generated from a cap and substrate attachment and thus improve accuracy of the sensor.

BACKGROUND

MEMS (microelectromechanical systems) pressure sensors are generally known and widely used. One type of pressure sensor is an absolute pressure sensor which includes a pressure sensing circuit, typically a piezoresistor bridge, formed on the top side of a silicon substrate, and a glass pedestal anodically bonded to the backside of the silicon substrate where a cavity is located to form a reference vacuum. For such an absolute pressure sensor, the front side of the device where the sensing circuit is located faces the pressure media. Many absolute pressure sensors are used in applications in which the sensors are exposed to a harsh media. For such applications, the front side sensing by a traditional absolute pressure sensor cannot survive in the harsh media. These environments require another type of absolute pressure sensor, such as a backside absolute (BSA) pressure sensor, which is resistant to exposure to harsh media.

One typical BSA pressure sensor includes a top cap to enclose a cavity on the front side of the silicon substrate, having the sensing circuit. The cavity contains a reference vacuum and the backside of the sensor is exposed to the pressure media. The reference vacuum is enclosed in a cavity formed by bonding the top cap to the top side of the silicon substrate embedded with a sensing circuit. The backside of the silicon substrate may be bonded with a pedestal having an aperture for accessing the backside of the silicon diaphragm to the pressure media. The silicon diaphragm is formed by selectively removing a portion of bulk silicon from the backside of the silicon substrate.

However, these types of BSA pressure sensors have certain operational drawbacks, such as high cavity pressure due to the residual gasses accumulated during the anodic bonding step for a design and process having limited depth of the cavity of the cap, which may cause high output errors at low/high operating temperature.

Another issue that may occur is a large variation of the cap bonding boundary to enclose the cap cavity. This is because the lateral dimension of the cap cavity is difficult to control while etching the cap cavity. In general, the deeper the depth of the cavity of the cap, the bigger the lateral dimensional error of the cavity of the cap. The lateral dimension of the cap cavity determines the cap bonding boundary with the silicon substrate. The cap bonding boundary is an important factor effecting on the distribution and level of thermal stresses on the sensing circuit. These process errors are often beyond allowed bonding boundary tolerance for balancing thermal stresses, resulting in high output error, which reduces the device yield. Furthermore, these types of sensors are also subject to weak diaphragm strength, and diaphragm damage may result from high pressure fluctuations in different applications.

Accordingly, there exists a need for a BSA pressure sensor which overcomes the drawbacks discussed above.

SUMMARY

An object of the invention is to fulfill the needs referred to above. In accordance with the principles of the embodiments, a pressure sensor includes a top cap with a recess formed in an end of the top cap and a cavity formed in the end of the top cap to communicate with the recess. The cavity extends further axially into the top cap than the recess thereby having depth greater than a depth of the recess. Outer edges of the recess extend laterally outward beyond outer edges of the cavity thereby defining a bonding boundary. A silicon substrate has a sensing circuit associated with a top side thereof. The top cap is bonded to the top side of the silicon substrate in a range from the outer edges of the top cap to the bonding boundary. The recess and the cavity of the top cap face the top side of the silicon substrate and form a reference vacuum cavity. When pressure is exerted on a backside of the substrate, a portion of the substrate is constructed and arranged to deflect.

In accordance with another aspect of an embodiment, a method of making a top cap for a pressure sensor provides a cap substrate. A recess is etched into an end of the cap substrate. A cavity is etched into a portion of the recess such that the cavity extends axially further into the cap substrate than the recess and such that outer edges of the recess extend laterally outward beyond outer edges of the cavity to define a bonding boundary.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
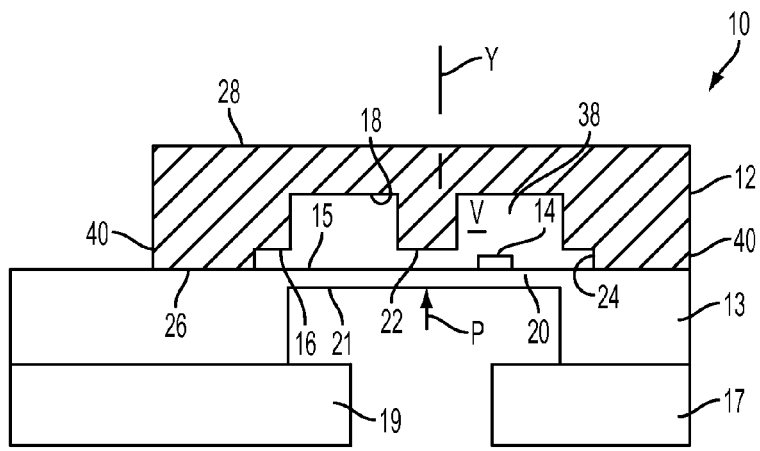
FIG. 1 is a side view of backside absolute pressure sensor, according to an embodiment.
Figures 2A, 2B, 2C, 2D:
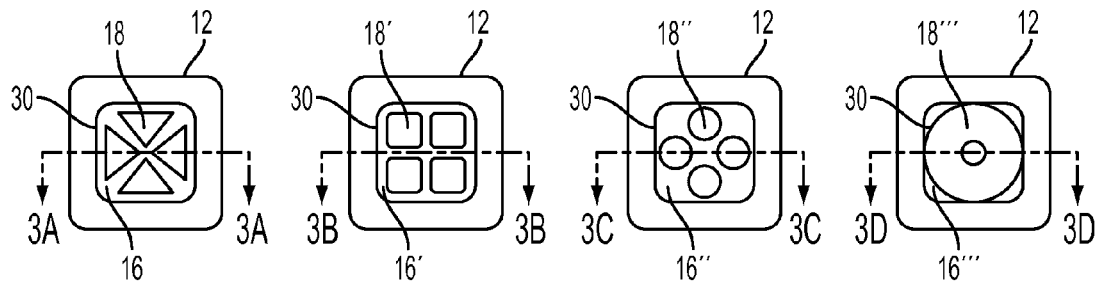
FIG. 2A is a top view of a top cap which is part of a backside absolute pressure sensor, according to an embodiment.
FIG. 2B is a top view of a top cap which is part of a backside absolute pressure sensor, according to another embodiment.
FIG. 2C is a top view of a top cap which is part of a backside absolute pressure sensor, according to yet another embodiment.
FIG. 2D is a top view of a top cap which is part of a backside absolute pressure sensor, according to a further embodiment.

An absolute pressure sensor is shown, generally indicated at 10, in FIG. 1 in accordance with an embodiment of the present invention. The pressure sensor 10 is for use in harsh media and includes a top cap 12 and a silicon substrate 13 bonded thereto. A pressure sensing circuit 14 is associated with a top side 15 of the substrate 13. At least a portion of the pressure sensing circuit 14 is formed on or embedded in the top side of a diaphragm 20 of the substrate 13. The circuit 14 is preferably a piezoresistor bridge such as disclosed in U.S. Pat. No. 8,171,800 B1, the content of which is hereby incorporated by reference into this specification. A pedestal 17 is bonded to a bottom of the substrate 13 in the conventional manner and the pedestal 17 includes an aperture 19 in communication with a backside 21 of the substrate 13.

Figures 3A, 3B, 3C, 3D:
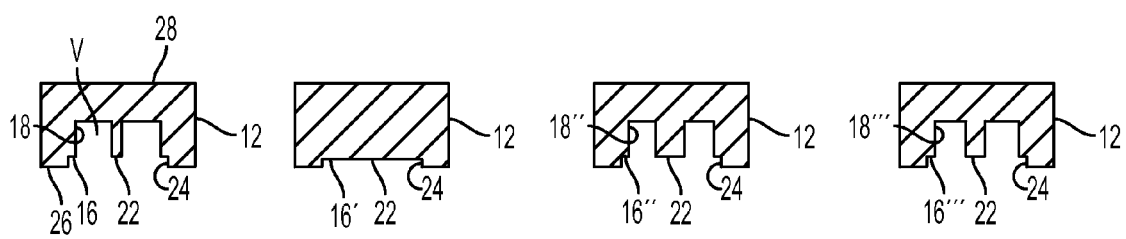
FIG. 3A is a sectional view taken along line 3A-3A of FIG. 2A.
FIG. 3B is a sectional view taken along line 3B-3B of FIG. 2B.
FIG. 3C is a sectional view taken along line 3C-3C of FIG. 2C.
FIG. 3D is a sectional view taken along line 3D-3D of FIG. 2D.

The top cap 12 includes both a shallow recess 16, which in the embodiment has a depth of less than about 10 µm, and a deep cavity 18 in communication with the shallow recess 16. The recess 16 and cavity 18 extend in the axial direction Y. In the embodiment, the deep cavity 18 has a depth of greater than about 100 µm. While examples of the depths of the shallow recess 16 and deep cavity 18 have been described, it is within the scope of the invention that other depths may be used. A portion 22, defining a surface of the shallow recess 16, is axially aligned with the center of a diaphragm 20 in the substrate 13 so as to constrain deformation of the diaphragm 20 to avoid the damage by high pressure peaks in field applications. Edges 24 of the shallow recess 16 in the lateral dimension (orthogonal to axis Y) define a cap bonding boundary (as explained further below), adjacent to where the cap 12 is bonded to the substrate 13. This is unlike the conventional cap, where the bonding boundary is defined by the lateral edges of the deep cavity. As shown FIG. 3A, the recess 16 and cavity 18 define an open end 26 of the top cap 12. Opposing end 28 of the top cap 12 is a closed end so a closed reference vacuum cavity 38 is defined when the top cap 12 is bonded to the substrate 13.

The deep cavity 18 defines a large cavity volume V to accommodate residual gases in the recess 16 and the cavity 18 to achieve required reference vacuum level. The shallow recess 16 has a minimal process tolerance capable of accurately defining the bonding boundary.

FIGS. 2A-2D and FIGS. 3A-3D show alternate embodiments of the top cap 12, with like numbers having like elements. The variations in the top cap 12 include a rectangular bonding boundary defined by the shallow recess 16, 16', 16" or 16'". The bonding boundary includes rounded corners 30. Each cavity 18, 18', 18" and 18'" extends from the associated shallow recess 16, 16', 16" and 16'", respectively, axially into the cap 12. In other alternate embodiments, the bonding boundary (shallow recess 16) may be of other shapes, such as circular (not shown).

Figure 4:
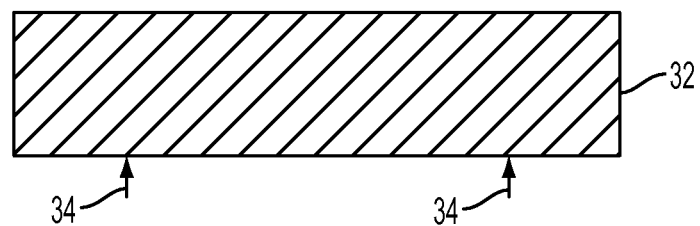
FIG. 4 is a sectional view of a blank cap substrate used to create a top cap which is part of a backside absolute pressure sensor, according to an embodiment.
Figure 5:
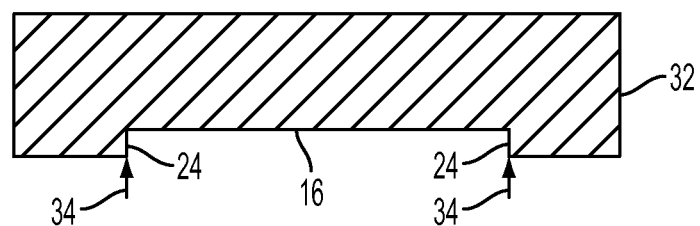
FIG. 5 is a sectional view of a cap substrate with only the shallow recess formed in the blank cap substrate of FIG. 4, according to an embodiment.
Figure 6:
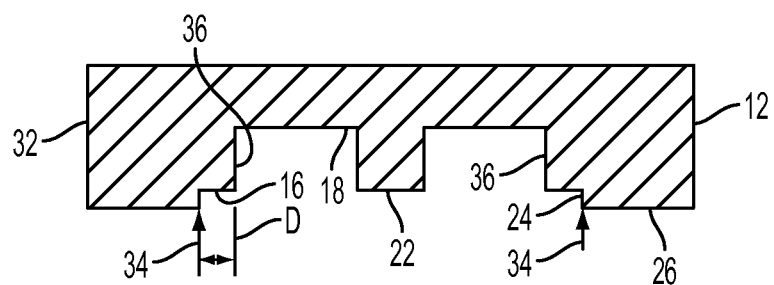
FIG. 6 is a sectional view of a complete top cap having both a shallow recess and deep cavity formed therein, according to an embodiment.

FIGS. 4-6 demonstrate the steps used to create a top cap 12 according to the embodiment of FIG. 1. For simplicity of drawing, FIGS. 4-6 only show one cap structure 12 on a portion of a cap wafer 32. The MEMS fabrication process is, however, capable of fabricating many copies of the same cap structure 12 in each cap wafer 32. FIG. 4 shows a portion of a blank cap wafer 32, and the arrows 34 indicate the target bonding boundary which is implemented by the outer, lateral edges 24 of the shallow recess 16, as shown in FIG. 5. The step of forming the shallow recess 16 is shown in FIG. 5. Thus, the shallow recess 16 is etched into an end of the substrate 32 to a depth less than about 10 µm. Advantageously, the process of shallow etching has negligible process tolerance in the lateral dimension of the recess 16, so that the bonding boundary is accurately implemented by the outer lateral edges 24 of the shallow recess 16. The next step in the process is shown in FIG. 6, where the deep cavity 18 is etched into the shallow recess 16 so as to have a depth greater than about 100 µm. During the formation of the deep cavity 18, a sufficient process tolerance window is provided to avoid the edges 36 of the deep cavity 18 extending outwardly beyond the edges 24 of the shallow recess 16. Thus, it is important that the lateral edges 24 of the shallow recess 16 extend beyond the lateral edges 36 of the deep cavity 18. The process tolerance window is the distance D between the outer edge 36 of the deep cavity 18 and the outer edges 24 of the shallow recess 16. In this embodiment, the process tolerance window D is greater than 30 µm, but it is within the scope of the invention that other distances (based on the etching process used) may be used, to avoid the edges 36 of the deep cavity 18 extending outwardly beyond the edges 24 of the shallow recess 16.

Returning to FIG. 1, once the top cap 12 is formed, end 26 thereof is bonded to the top side 15 of the substrate 13 in a range from the outer edges 40 of the cap 12 to the bond boundary defined by edges 24 of the shallow recess 16. The recess 16 and the cavity 18 of the top cap 12 face the top side 15 of the silicon substrate 13 and form the reference vacuum cavity 38. Since a reference vacuum V is in cavity 38, absolute pressure sensing occurs when the diaphragm 20 deflects upwardly and downwardly responsive to pressure P applied to the backside 21 of the substrate 13 via aperture 19 in the pedestal 17.

Thus, the embodiments provide a backside absolute pressure sensor 10 which is constructed to effectively balance the thermal stresses generated from cap and substrate attachment to achieve required device accuracy. The cap bonding boundary affects the thermal stresses over the pressure sensing bridge 14. The allowed window of the bonding boundary, defined by the lateral edges of the shallow recess 16, for balancing the thermal stresses is typically smaller than the process tolerance when forming a deep cavity using glass-Si bonding, especially for wet etching techniques. This is because the lateral etch rate in the deep cavity etch process is very difficult to predict and control, and often changes in wafer-to-wafer, lot-to-lot, and other process conditions. The deeper the cavity, the bigger the process tolerance in lateral cavity dimension. In many current approaches, the edges of the deep cavity define the bonding boundary, which results in a large yield loss and requires lengthy screening test to reject the high deviation devices. The present embodiment uses a cap structure having both a shallow recess (having a depth of less than 10 µm) and a deep cavity (having a depth of more than 100 μm). The shallow recess is used to accurately define the bonding boundary, which has negligible process error in lateral recess dimension, comparing the allowed window for balancing thermal stresses. In addition, the shallow recess 16 also protects the diaphragm damage from the high pressure peaks generated in some applications. The deep cavity accommodates the residual gases in the cavity to achieve required vacuum level for accurate absolute pressure sensing.

The description of the embodiments is merely exemplary in nature and, thus, variations that do not depart from the gist of the invention are intended to be within the scope of the invention. Such variations are not to be regarded as a departure from the spirit and scope of the invention.

What is claimed is:

1. A pressure sensor comprising:
   a top cap;
   a recess formed in an end of the top cap;
   a cavity formed in the end of the top cap and communicating with the recess such that the cavity extends further axially into the top cap than the recess thereby having depth greater than a depth of the recess, outer edges of the recess extend laterally outward beyond outer edges of the cavity thereby defining a bonding boundary; and
   a silicon substrate having a sensing circuit associated with a top side thereof, the top cap being bonded to the top side of the silicon substrate in a range from the outer edges of the top cap to the bonding boundary;
   wherein the recess and the cavity of the top cap face the top side of the silicon substrate and form a reference vacuum cavity and wherein, when pressure is exerted on a backside of the substrate, a portion of the silicon substrate is constructed and arranged to deflect,
   wherein the portion of the silicon substrate comprises a diaphragm and at least a portion of the sensing circuit is associated with the top side of the diaphragm and in opposing relation with respect to the cavity, and
   wherein the to cap includes a portion within the cavity that is axially aligned with a center of the diaphragm and which defines a surface of the recess so as to constrain deformation of the diaphragm.

2. The sensor of claim 1, wherein the recess is generally rectangular having rounded corners.

3. The sensor of claim 1, wherein the depth of the recess is less than about 10 μm and the depth of the cavity is greater than about 100 μm.

4. The sensor of claim 1, further comprising a pedestal, wherein the pedestal is bonded to the bottom of the silicon substrate.

5. The sensor of claim 4, wherein the pedestal further comprises an aperture, the aperture being in communication with a backside of the diaphragm.

6. A method of making a top cap for a pressure sensor, comprising the steps of:
   providing a cap substrate;
   etching a recess into an end of the cap substrate; and
   etching a cavity into a portion of the recess such that the cavity extends axially further into the cap substrate than the recess, and such that outer edges of the recess extend laterally outward beyond outer edges of the cavity to define a bonding boundary,
   bonding a top side of a silicon substrate to the cap substrate in a range from the outer edges of the top cap to the bonding boundary, the silicon substrate having a sensing circuit associated with the top side thereof,
   wherein a portion of the silicon substrate comprises a diaphragm and at least a portion of the sensing circuit is associated with the top side of the diaphragm, and
   wherein the cap substrate is provided with a portion within the cavity that is axially aligned with a center of the diaphragm and which defines a surface of the recess so as to constrain deformation of the diaphragm.

7. The method of claim 6, wherein the recess is provided as a generally rectangular recess having rounded corners.

8. The method of claim 6, wherein the depth of the recess is less than about 10 μm and the depth of the cavity is greater than about 100 μm.

9. The method of claim 6, further comprising bonding a pedestal to a bottom of the silicon substrate.

10. The method of claim 9, wherein the pedestal further comprising an aperture, the aperture being in communication with a backside of the diaphragm.

11. A top cap for a pressure sensor comprising:
    a cap substrate;
    a recess formed in an end of the cap substrate; and
    a cavity formed in a portion of the recess such that the cavity extends axially further into the cap substrate than the recess, and such that outer edges of the recess extend laterally outward beyond outer edges of the cavity to define a bonding boundary,
    wherein a depth of the recess is less than about 10 μm and a depth of the cavity is greater than about 100 μm, and
    wherein the cap substrate is provided with a central portion extending within the cavity and which defines a surface of the recess.

12. The top cap of claim 11 wherein the recess is a generally rectangular recess having rounded corners.

* * * * *